(12) United States Patent
Lee (10) Patent No.: US 11,630,588 B2
(45) Date of Patent: Apr. 18, 2023

(54) CONTROLLER AND MEMORY SYSTEM INCLUDING THE SAME

(71) Applicant: SK hynix Inc., Gyeonggi-do (KR)

(72) Inventor: Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 172 days.

(21) Appl. No.: 17/241,815

(22) Filed: Apr. 27, 2021

(65) Prior Publication Data

US 2022/0179564 A1 Jun. 9, 2022

(30) Foreign Application Priority Data

Dec. 9, 2020 (KR) ......................... 10-2020-0171283

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .... G06F 3/0619; G06F 3/0655; G06F 3/0679; G06F 11/08; G06F 3/0658; G06F 11/1052; G06F 11/1076; Y02D 10/00; G11C 29/42; G11C 29/52
See application file for complete search history.

(56) References Cited

U.S. PATENT DOCUMENTS

| | | | |
|---|---|---|---|
| 8,977,813 B2 | 3/2015 | Burd | |
| 9,063,875 B2 | 6/2015 | Radke | |
| 2019/0097654 A1* | 3/2019 | Zhang | ................ G06F 11/1004 |
| 2019/0155686 A1* | 5/2019 | Kumar | ............... H03M 13/1105 |

* cited by examiner

*Primary Examiner* — Jason W Blust
(74) *Attorney, Agent, or Firm* — IP & T Group LLP (57) ABSTRACT

A controller for controlling a memory device may include: an end-to-end decoder suitable for correcting an error in the unit user data and the corresponding end-to-end parity; an internal encoder suitable for generating a data chunk by adding a first internal parity to the source word which includes the unit user data and the end-to-end parity from the end-to-end decoder and buffering the source word into a buffer; an integrity checker suitable for determining whether an error is included in the source word, by using the end-to-end parity from the end-to-end decoder; and a parallel parity generator suitable for receiving the source word from the buffer according to a result of the determination, and completing a parallel parity based on a predetermined number of source words received, wherein the internal encoder is further suitable for generating a parity chunk by adding a second internal parity to the completed parallel parity.

19 Claims, 8 Drawing Sheets

CONTROLLER AND MEMORY SYSTEM INCLUDING THE SAME

CROSS-REFERENCE TO RELATED APPLICATION

This application claims priority under 35 U.S.C. § 119 to Korean Patent Application No. 10-2020-0171283 filed on Dec. 9, 2020, which is incorporated herein by reference in its entirety.

BACKGROUND

1. Field

Various embodiments relate to a controller and a memory system including the same.

2. Discussion of the Related Art

The computer environment paradigm has been transitioning to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a controller capable of improving the reliability of data stored in a memory device by generating a parallel parity whose reliability is guaranteed, and a memory system including the same.

Also, various embodiments of the present disclosure are directed to a controller capable of improving write performance of data by rapidly generating a parallel parity whose reliability is guaranteed, and a memory system including the same.

In accordance with an embodiment of the present disclosure, a controller for controlling a memory device, includes: a host interface suitable for adding an end-to-end parity to unit user data; an end-to-end decoder suitable for correcting an error in the unit user data and the end-to-end parity; an internal encoder suitable for generating a data chunk by adding a first internal parity to the source word which includes the unit user data and the end-to-end parity from the end-to-end decoder and buffering the source word into a buffer; an integrity checker suitable for determining whether an error is included in the source word included in the data chunk, by using the end-to-end parity from the end-to-end decoder; and a parallel parity generator suitable for receiving the source word from the buffer according to a result of the determination, and completing a parallel parity based on a predetermined number of source words received from the buffer, wherein the internal encoder is further suitable for generating a parity chunk by adding a second internal parity to the completed parallel parity.

The controller may further include a command generator suitable for controlling a memory device to program the data chunk and the parity chunk.

The integrity checker may be further suitable for outputting a failure signal when an error is included in the source word and invalidating the data chunk programmed in the memory device.

The controller may further include a processor suitable for controlling the host interface to re-acquire the unit user data from a host and add an end-to-end parity to the reacquired unit user data, in response to the output failure signal.

The controller may further include a processor suitable for providing a signal to the host in response to the output failure signal, the signal notifying a defect of a memory system including the controller and the memory device.

The integrity checker may determine whether the error is included in the end-to-end parity included in the source word by comparing the end-to-end parity from the end-to-end decoder to the end-to-end parity included in the source word.

The integrity checker may determine whether the error is included in the unit user data included in the source word, by detecting the error of the unit user data included in the source word through the end-to-end parity from the end-to-end decoder.

The parallel parity generator may complete the parallel parity by performing a chip kill operation on the predetermined number of source words for generating the parallel parity after the parallel parity is reset, the operation being performed whenever each of the predetermined number of source words is received.

The buffer may include a plurality of buffer regions and the buffer may be suitable for alternately selecting one of the buffer regions whenever each of the predetermined number of source word is received from the internal encoder and storing the source word in the selected buffer region.

The controller may further include a meta data inserter suitable for inserting meta data into the source word.

The controller may further include a checksum generator suitable for inserting a checksum into the source word, the checksum being used during a read operation on the data chunk to determine whether the data chunk is properly corrected by using the first internal parity added to the source word.

The controller may further include a scrambler suitable for scrambling the source word.

In accordance with an embodiment of the present disclosure, a memory system includes: a memory device comprising a plurality of memory dies; and a controller suitable for controlling the memory device, wherein the controller is further suitable for: correcting an error in unit user data and a corresponding end-to-end parity for acquiring an error-corrected end-to-end parity, generating a data chunk by adding an internal parity to a source word including the unit user data and the corresponding end-to-end parity, determining whether an error is included in the source word included in the data chunk, by using the error-corrected end-to-end parity and outputting the source word according to a result of the determining, and generating a parity chunk using a predetermined number of outputted source words.

The controller may be further suitable for controlling the plurality of memory dies to program the plurality of data chunks including the predetermined number of outputted source words and the parity chunk in parallel.

The controller may determine whether the error is included in the end-to-end parity included in the source word, by comparing the error-corrected end-to-end parity to the end-to-end parity included in the source word.

The controller may determine whether the error is included in the unit user data included in the source word by detecting the error of the unit user data included in the source word through the error-corrected end-to-end parity.

The controller may determine further suitable for completing a parallel parity by performing a chip kill operation on the predetermined number of source words for generating the parallel parity after the parallel parity is reset, and wherein the controller generates the parity chunk by adding a second internal parity to the completed parallel parity.

The memory system may further include a buffer including a plurality of buffer regions and suitable for alternately selecting one of the buffer regions whenever the data chunk is generated and storing the source word included in the data chunk in the selected buffer regions.

In accordance with an embodiment of the present disclosure, an operating method of a controller, the operating method includes: receiving block data including plural stripe data pieces each having plural page data pieces; generating a source word including each of the page data pieces and a corresponding end-to-end parity; obtaining an error-corrected end-to-end parity by error-correcting the source word; generating a data chunk including the source word and a corresponding internal parity; verifying integrity of the source word through the error-corrected end-to-end parity while controlling a nonvolatile memory device to store the data chunk in a memory block in units of the stripe data pieces; generating a chip kill parity corresponding to the block data by performing a logical operation on the data chunks corresponding to the block data on condition that the integrities of the source words corresponding to the block data are verified; generating a parity chunk including the chip kill parity and a corresponding internal parity; and controlling the nonvolatile memory device to store the parity chunk in the memory block.

In accordance with an embodiment of the present disclosure, a controller for controlling a nonvolatile memory device, includes: an interface suitable for generating plural source words corresponding to block data including plural stripe data pieces each having plural page data pieces, each of the source words including a corresponding one of the page data pieces and corresponding end-to-end parities; a decoder suitable for obtaining error-corrected end-to-end parities by error-correcting the source words, respectively; an encoder suitable for generating data chunks including the source words and internal parities, respectively; a checker suitable for verifying integrities of the source words through the error-corrected end-to-end parities, respectively, while the nonvolatile memory device stores the data chunks in a memory block in units of the stripe data pieces; and a generator suitable for generating a chip kill parity corresponding to the block data by performing a logical operation on the data chunks on condition that the integrities of the source words are verified, wherein the encoder is further suitable for generating a parity chunk including the chip kill parity and a corresponding internal parity so that the parity chunk is stored in the memory block.

In accordance with the present embodiments, it is possible to provide a controller capable of improving the reliability of data stored in a memory device by generating a parallel parity whose reliability is guaranteed, and a memory system including the same.

Furthermore, it is possible to provide a controller capable of improving write performance of data by rapidly generating a parallel parity whose reliability is guaranteed, and a memory system including the same.

DETAILED DESCRIPTION

Hereafter, various embodiments of the present disclosure will be described with reference to the accompanying drawings.

The present disclosure may, however, be embodied in different forms and are not limited to the embodiments set forth herein. Rather, these embodiments are provided so that this disclosure will be thorough and complete, and the scope of the present disclosure will be fully conveyed to those skilled in the art.

Figure 1:
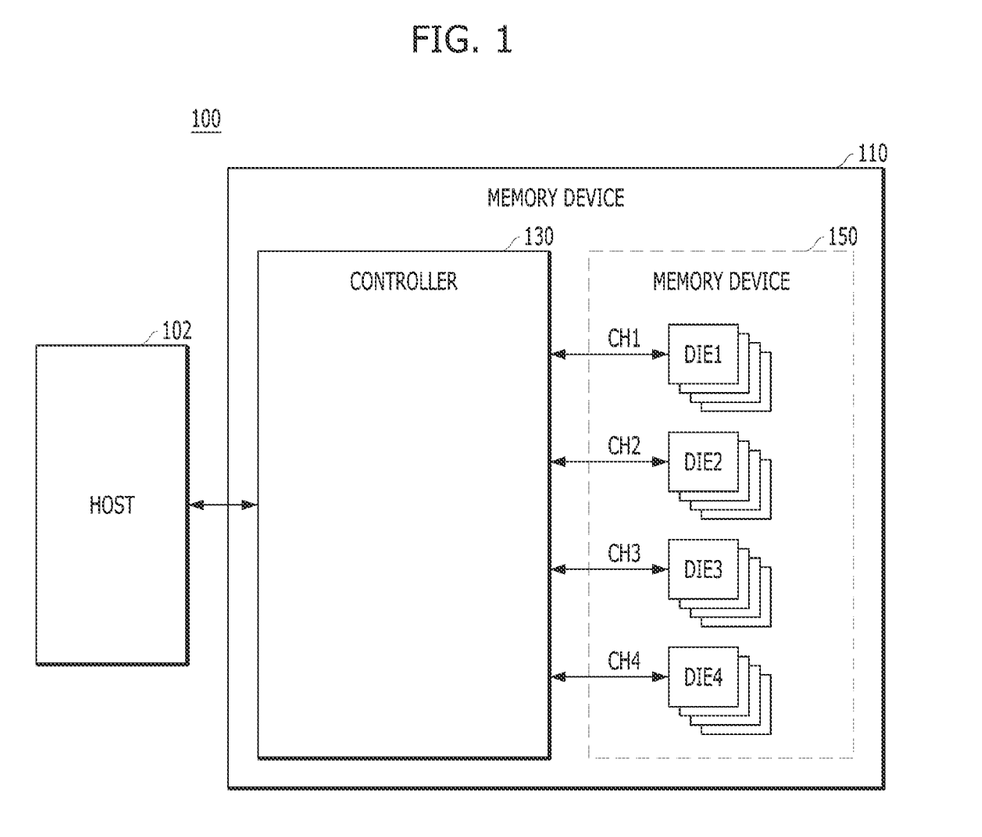
FIG. 1 is a diagram illustrating a data processing system 100 including a memory system 110.

Referring to FIG. 1, the data processing system 100 may include a host 102 operatively coupled to a memory system 110. The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phasechange RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 . . . each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

A write request or a read request provided to the controller 130 by the host 102 may include a logical address used in the host 102. For example, the logical address may be a logical block address (LBA) which is used in the file system of the operating system of the host 102.

The memory region of the memory device 150 may be identified by a physical address different from the logical address. For example, a different physical address may be allocated to each page of the memory device 150. The controller 130 may generate map data by mapping a logical address and a physical address to control the memory device 150.

The memory device 150 may include a plurality of memory dies. The plurality of memory dies may be coupled to the controller 130 through a plurality of channels CH1 to CH4. In FIG. 1, the memory dies coupled to the plurality of channels CH1 to CH4 are identified as first to fourth memory dies DIE1 to DIE4, respectively.

One memory die may receive one command at a time. The flash memory may include a plurality of memory dies. One memory die may include a plurality of planes, and the plurality of planes may process commands received by the memory die in parallel. Each of the planes may include a plurality of memory blocks. The memory block may correspond to the minimum unit of an erase operation. One memory block may include a plurality of pages. The page may correspond to the minimum unit of a write operation.

One channel may sequentially transfer commands to memory dies coupled to the channel, or may sequentially transfer data from the memory dies to the controller 130. However, the plurality of memory dies which receive the commands through the channel may simultaneously perform command operations.

Figure 2:
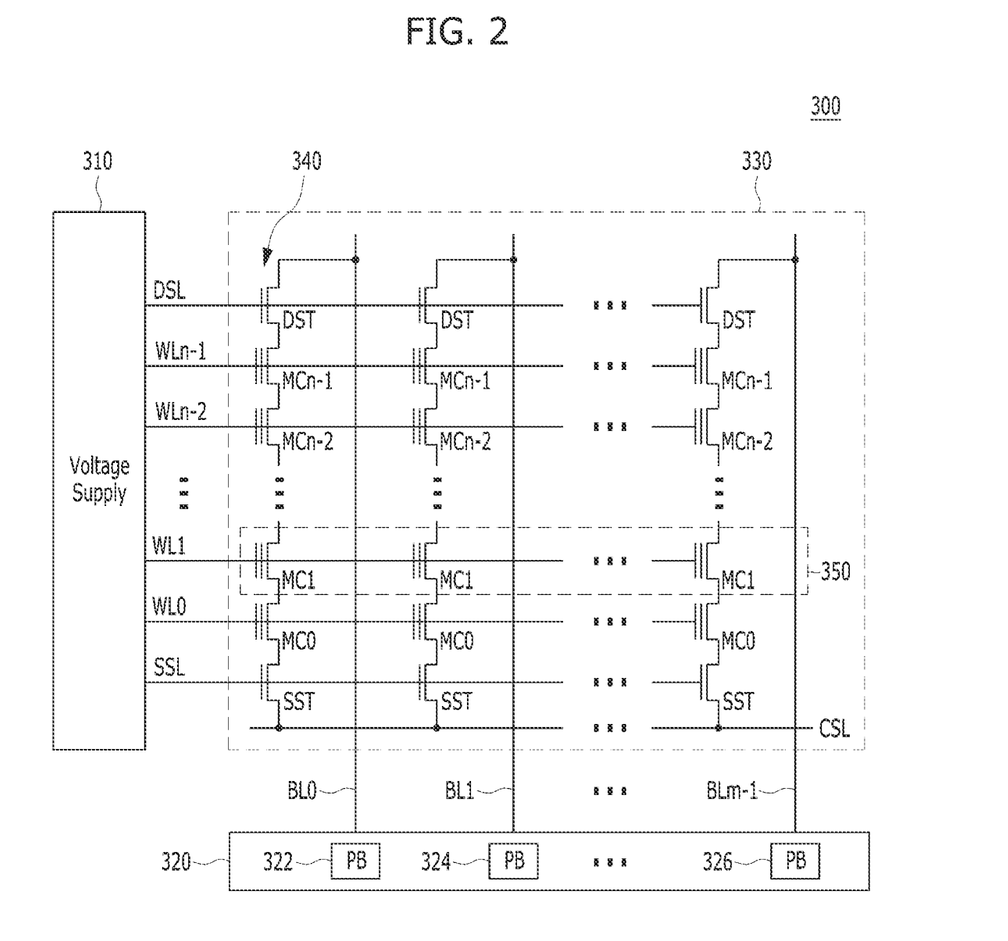
FIG. 2 is a circuit diagram illustrating a configuration of a plane 300 which may be included in each memory die.

FIG. 2 is a circuit diagram illustrating an example of a configuration of a plane 300 which may be included in each memory die.

Each of the first to fourth memory dies DIE1 to DIE4 illustrated in FIG. 1 may include at least one plane. The plane 300 may include a voltage supply 310, a read/write circuit 320 and a memory block 330. While the plane 300 may include a plurality of memory blocks, FIG. 2 illustrates one memory block 330 as an example.

A memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells or memory cell transistors MC0 to MCn-1 may be coupled in series. In an embodiment, each of the memory cells MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 2, the first cell string is coupled to the first bit line BL0, and the last cell string is coupled to the last bit line BLm-1. For reference, in FIG. 2, 'DSL' denotes a drain select line, 'SSL' denotes a source select line, and 'CSL' denotes a common source line.

Although FIG. 2 illustrates NAND flash memory cells, the invention is not limited in this way. It is noted that the memory cells may be different (e.g., NOR flash memory cells or hybrid flash memory cells including two or more types of memory cells combined therein). Also, it is noted that the memory device 150 including the plane 300 may be a flash memory device including a conductive floating gate as a charge storage layer or a charge trap flash (CTF) memory device including an insulation layer as a charge storage layer.

The plane 300 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The plane 300 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory cells of the memory block 330 may be coupled to a plurality of word lines WL0 to WLn-1. Memory cells coupled to one word line may be referred to as a physical page. FIG. 2 illustrates a physical page 350 including memory cells MC1 which are coupled to the word line WL1. Memory cells may be accessed by the unit of page by the voltage supply 310 and the read/write circuit 320.

One memory die may sequentially receive commands for a plurality of planes, from a channel. The plurality of planes which receive the commands may simultaneously perform command operations, each using a voltage supply and a read/write circuit.

Memory cells may be referred to as a single level cell (SLC) or a multi-level cell (MLC) depending on the number of bits which can be stored in one memory cell. A multi-level cell refers to a memory cell which, as one memory cell, can store data having at least two bits. For example, the multi-level cell may include a triple-level cell (TLC) or a quadruple-level cell (QLC).

Figure 3A:
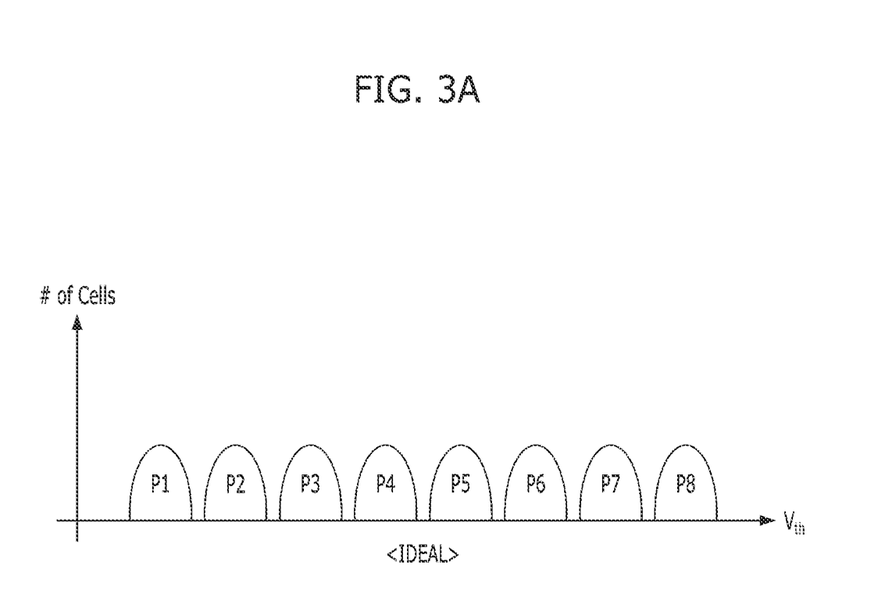
FIGS. 3A and 3B are graphs illustrating threshold voltage distributions of memory cells.

FIG. 3A is a graph illustrating a threshold voltage distribution of triple-level cells as an example of multi-level cells.

When three bits are programmed in a triple-level cell, any of $2^3$, that is, eight, threshold voltage distributions may be formed in the memory cell. Due to fine differences in electrical characteristics between a plurality of memory cells, the threshold voltages of memory cells which are programmed with the same data form a certain range of threshold voltage distribution. In the case of a triple-level cell, as illustrated in the drawing, eight threshold voltage distributions P1 to P8 are formed. The eight threshold voltage distributions P1 to P8 represent logic states that are different from one another. For example, a first threshold voltage distribution P1 of the eight threshold voltage distributions P1 to P8 may represent, as an erased state, a logic state of '111.' Three bits programmed in a triple-level cell may be referred to as a most significant bit (MSB), a central significant bit (CSB) and a least significant bit (LSB), respectively.

The eight threshold voltage distributions P1 to P8 of the memory cells may be formed through a single program operation. For example, the voltage supply 310 may perform a program operation of repeatedly performing a program pulse application operation for migrating threshold voltage distributions of the memory cells and a verify pulse application operation for verifying whether threshold voltages of the memory cells correspond to threshold voltage distributions corresponding to data to be programmed, thereby forming the eight threshold voltage distributions P1 to P8 of the memory cells. A program operation for forming, at once, a plurality of threshold voltage distributions corresponding to three bits may be referred to as a one-shot program operation.

Which logic state a memory cell has may be identified using a plurality of read voltages R1 to R7. For example, a memory cell may be turned on when a read voltage having a level higher than its threshold voltage is applied, and may be turned off when a read voltage having a level lower than its threshold voltage is applied. Data may be read by sensing a current formed in a bit line as the memory cell is turned on or off.

Figure 3B:
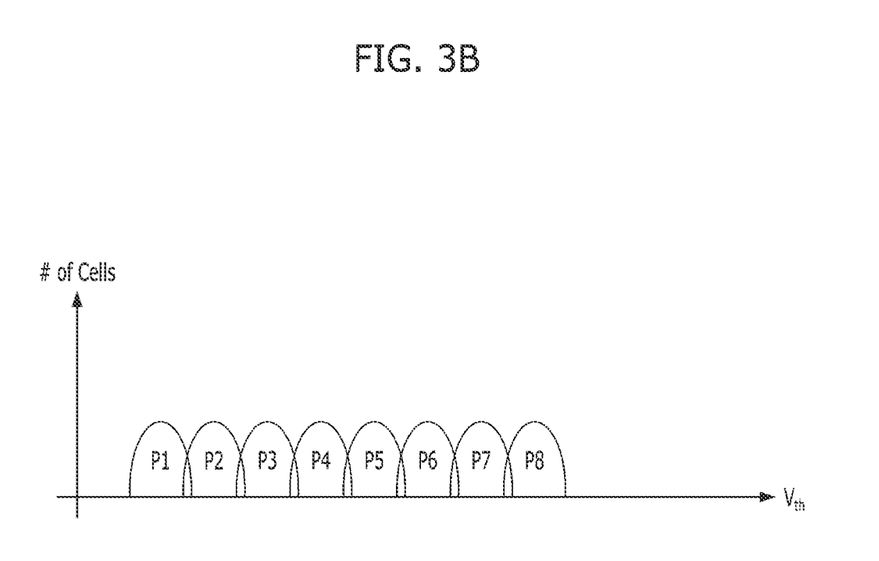

Referring to the flash memory example of FIG. 3B, the memory cell may experience charge loss in which electrons trapped at a floating gate or tunnel oxide film are discharged over time. Such charge loss may accelerate when the tunnel oxide film deteriorates by iterative program and erase operations. Charge loss results in a decrease in the threshold voltages of memory cells. For example, as illustrated in FIG. 3B, the threshold voltage distribution may be shifted left due to charge loss.

Furthermore, program disturbance, erase disturbance and/or back pattern dependency may increase the distributions of the threshold voltages. Therefore, the characteristic degradation of the memory cells by the above-described causes may change the threshold voltage distributions P1 to P8, such that adjacent threshold voltage distributions overlap each other as illustrated in FIG. 3B.

What is therefore required is a method for precisely reading data stored in memory cells of a semiconductor memory device.

Figure 4:
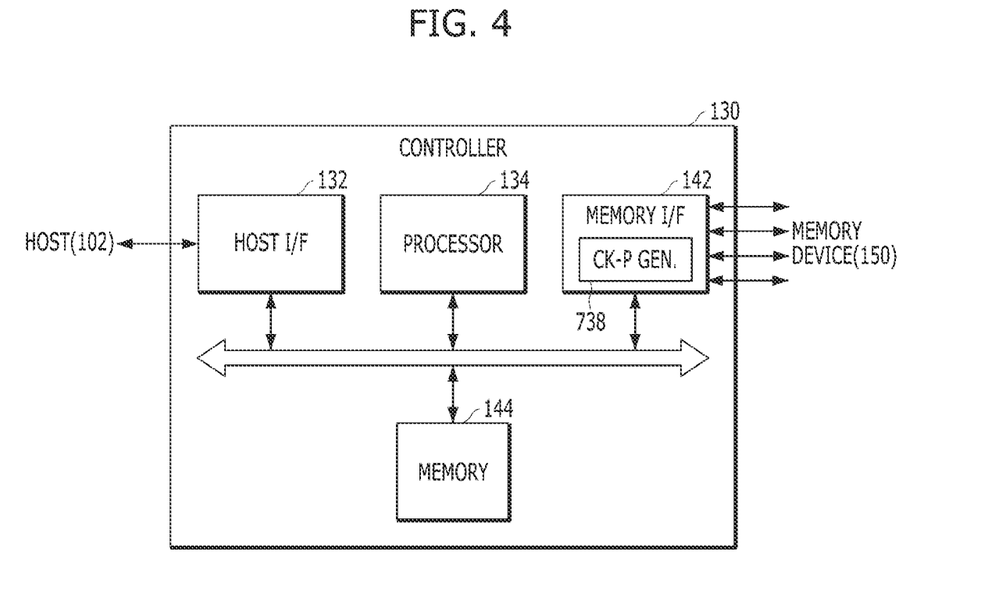
FIG. 4 is a diagram illustrating an architecture of a controller 130 in accordance with an embodiment of the present disclosure.

FIG. 4 is a diagram illustrating a structure of the controller 130 in accordance with the embodiment of the present disclosure. The controller 130 may include a host interface (I/F) 132, a processor 134, a memory I/F 142, and a memory 144 all operatively coupled via an internal bus.

The processor 134 may control the overall operations of the memory system 110. The processor 134 may be driven by instructions e.g., firmware to control the overall operations of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host. For example, the processor 134 may control a write operation of the memory device 150 in response to a write request from the host and control a read operation of the memory device 150 in response to a read request from the host.

Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 4 exemplifies the memory 144 disposed within the controller 130. In an embodiment, the memory 144 may be embodied by an external volatile memory having a memory interface transferring data between the memory 144 and the controller 130.

The host I/F 132 may be configured to process a command and data of the host 102, and may communicate with the host 102 through various communication standards or interfaces. Examples include an universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through instructions e.g., firmware referred to as a host interface layer (HIL) in order to exchange data with the host.

The host I/F 132 may add an end-to-end parity to data received from the host 102. For example, the host I/F 132 may generate an end-to-end parity E2E_P using an error detection code such as a CRC (Cyclic Redundancy Check) code or an error correction code such as a Hamming code or BCH (Bose, Chaudhuri, Hocquenghem) code. The host I/F 132 may guarantee the integrity of the data within the memory system 110 using the end-to-end parity E2E_P.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through instructions e.g., firmware referred to as a flash interface layer (FIL) in order to exchange data with the memory device 150.

The memory I/F 142 may perform an internal parity operation of adding an internal parity into the data in order to guarantee the reliability of data programmed to the memory device 150. The memory I/F 142 may detect and correct an error included in data read from the memory device 150 using the internal parity. The memory I/F 142 may use an error correction code such as an LDPC (Low Density Parity Check) code, BCH (Bose, Chaudhuri, Hocquenghem) code, turbo code, Reed-Solomon code, convolution code, RSC (Recursive Systematic Code), TCM (Trellis-Coded Modulation) or BCM (Block Coded Modulation), in order to perform the internal parity operation.

Furthermore, the controller 130 may interleave commands to be provided to a plurality of memory dies and then provide the interleaved commands to the memory device 150. Interleaving the commands may refer to the controller 130 determining a command providing order so that the commands may be sequentially provided to the plurality of memory dies. Since the plurality of memory dies may simultaneously operate based on the interleaved commands, the throughput of the memory system 110 may be improved.

In order to improve the throughput of the memory system 110, the controller 130 may collect a predetermined amount of data to be programmed so that the data is simultaneously programmed into a plurality of physical pages. The predetermined amount of data may correspond to a stripe, which will be described later.

The controller 130 may group a plurality of memory blocks, handle the grouped memory blocks as a super block, and access the memory device 150 in stripe units included in the super block, in order to interleave commands provided to the memory device 150.

Figure 5:
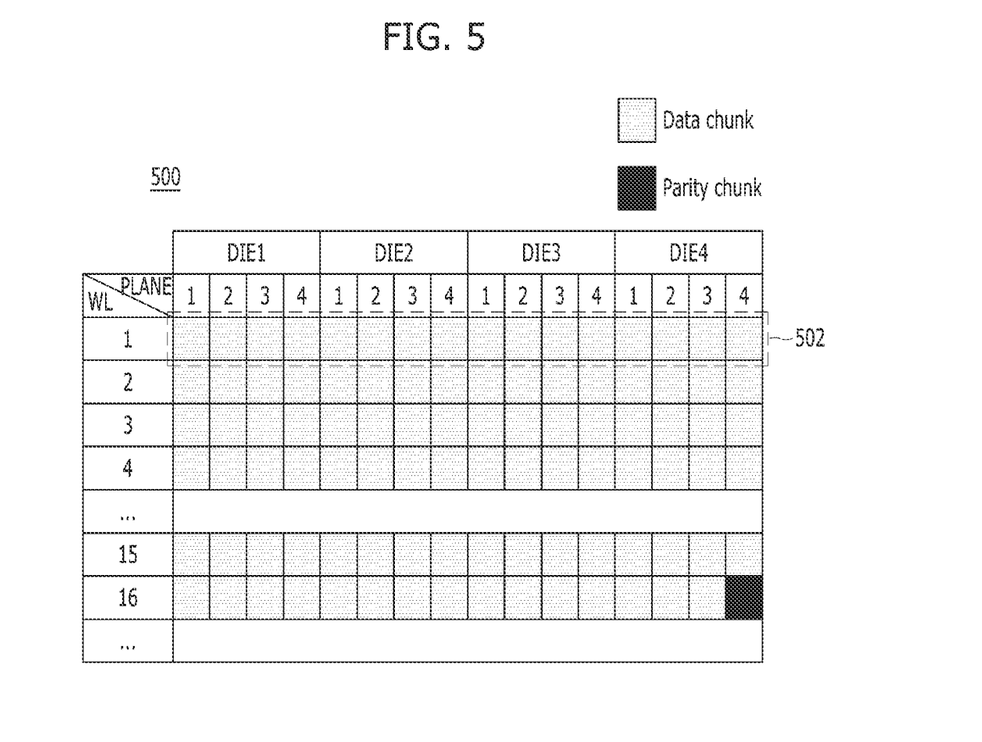
FIG. 5 is a diagram for describing a super block 500.

FIG. 5 is a diagram for describing a super block 500.

The controller 130 may configure the super block 500 by grouping physical blocks which can be accessed in parallel. FIG. 5 illustrates the super block 500 configured by grouping one memory block in each of first to fourth planes included in each of the memory dies DIE1 to DIE4. Each of the first to fourth planes may correspond to the plane 300 described with reference to FIG. 2.

The controller 130 may configure a stripe by grouping pages which can be accessed at the same time, among a plurality of physical pages included in the super block 500. The controller 130 may group physical pages which can be accessed at the same time by memory dies coupled to different channels, among the plurality of physical pages included in the super block 500. FIG. 5 illustrates a stripe 502 configured by grouping one physical page from each of the memory blocks. In FIG. 5, physical pages may be identified by word lines WL.

The controller 130 may control a program operation and a read operation of the memory device 150 in units of the stripes. The controller 130 may collect a predetermined number of data chunks to be simultaneously written in a plurality of physical pages included in the stripe 502. One data chunk may include data having a size that can be identified by one logical address in the host 102, for example, user data of 4 KB, and an end-to-end parity and internal parity of the user data. The controller 130 may interleave write commands to simultaneously program the collected data chunks to the physical pages within the stripe 502. The operation in which the controller 130 arranges the plurality of collected data chunks to be simultaneously programmed in the plurality of physical pages within the stripe 502 may be referred to as a striping operation. When the striping operation is completed, the controller 130 may provide program commands for the stripe 502 to the memory device 150.

In some cases, depending on the number of error bits in a data chunk read from the memory device 150, the data chunk may not be corrected through the internal parity. The memory I/F 142 may generate a parity chunk by performing a parallel parity operation on a plurality of data chunks programmed to the memory device 150, in order to recover a data chunk in which an uncorrectable error is included.

FIG. 5 illustrates the case in which one data chunk is stored in one physical page. In FIG. 5, a physical page illustrated as a dot pattern indicates a physical page in which a data chunk is stored, and a physical page illustrated as a solid pattern indicates a physical page in which a parity chunk is stored.

In the example of FIG. 5, the memory I/F 142 may configure one stripe bundle by grouping 16 stripes. The stripe bundle may include the plurality of data chunks and the parity chunk. The memory I/F 142 may generate the parity chunk of data chunks which are stored in 255 physical pages included in the stripe bundle. Referring to FIG. 4, a chip kill parity generator 738 for performing a chip kill operation as an example of the parallel parity operation for generating the parity chunk may be included in the memory I/F 142.

Referring back to FIG. 5, any of the stripes included in the stripe bundle may include the plurality of data chunks and the parity chunk. The memory I/F 142 may control the memory device 150 to program the plurality of data chunks and the parity chunk in parallel.

When an uncorrectable error is included in any of the data chunks, the memory I/F 142 may recover the data chunk in which the uncorrectable error is included, by performing an operation on the other data chunks and the parity chunk.

The number of data chunks which can be stored in one physical page is not limited to the example of FIG. 5. For example, when memory blocks constituting the super block 500 is a TLC memory block, one physical page may include an MSB (Most Significant Bit) page, a CSB (Central Significant Bit) page and an LSB (Least Significant Bit) page as sub pages. When each of the sub pages can store two data chunks, one physical page can store six data chunks.

The memory I/F 142 in accordance with the present embodiment, which generates a parity chunk and programs the parity chunk to the memory device 150, will be described with reference to FIGS. 6A to 6C, 7, 8A to 8C and 9.

Figure 6A:
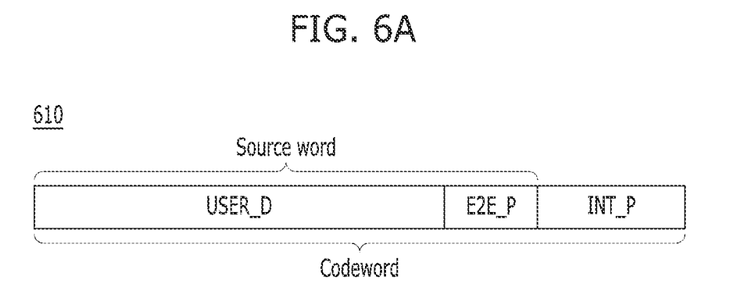
FIGS. 6A to 6C are diagrams for describing a parallel parity operation in accordance with a first embodiment of the present disclosure.
Figure 6B:
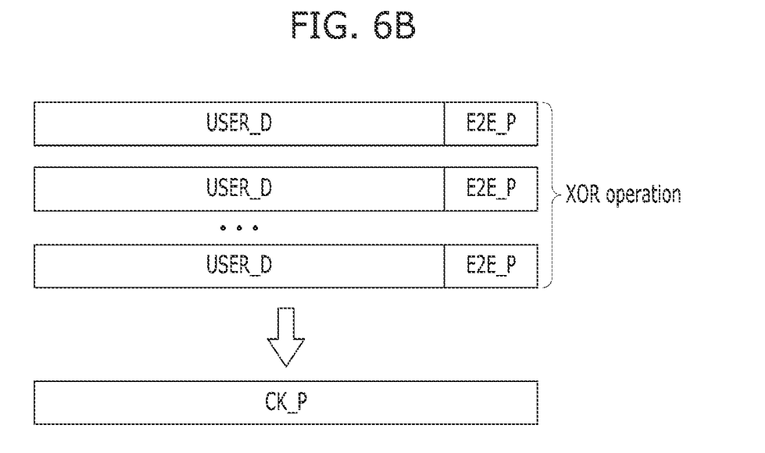
Figure 6C:
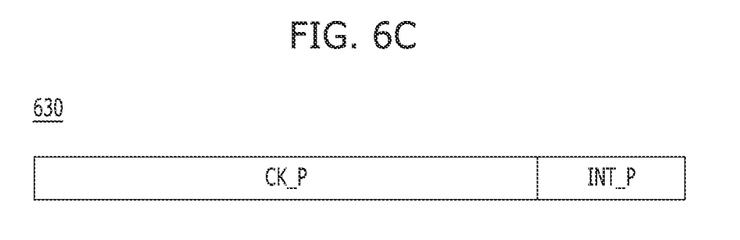

FIGS. 6A to 6C are diagrams for describing a parallel parity operation in accordance with a first embodiment of the present disclosure.

FIG. 6A illustrates a data chunk 610.

The data chunk 610 may include unit user data USER_D, an end-to-end parity E2E_P and an internal parity INT_P. As described with reference to FIG. 4, the end-to-end parity E2E_P may be added by the host I/F 132. The memory I/F 142 may generate the internal parity INT_P by performing an internal parity operation on a source word including the unit user data USER_D and the end-to-end parity E2E_P and generate a codeword or the data chunk 610 by adding the internal parity INT_P to the source word.

FIG. 6B illustrates a chip kill operation as an example of the parallel parity operation.

In the example of FIG. 6B, the chip kill operation may include an operation of generating a chip kill parity CK_P by performing an XOR operation on unit user data USER_D and end-to-end parities E2E_P which are included in a plurality of source words (e.g., source words included in 255 number of data chunks in the example of FIG. 5).

FIG. 6C illustrates a parity chunk 630 which is generated based on the parallel parity operation result.

The parity chunk 630 may include the chip kill parity CK_P and the internal parity INT_P. The memory I/F 142 may generate the internal parity INT_P by performing an internal parity operation on the chip kill parity CK_P, and generate the parity chunk 630 by adding the internal parity INT_P to the chip kill parity CK_P.

When an uncorrectable error is included in the data chunk 610, the memory I/F 142 may perform an XOR operation on the parity chunk 630 and the other data chunks on which the chip kill operation has been performed with the data chunk 610, thereby recovering the data chunk 610 in which the uncorrectable error is included.

Referring to FIGS. 6A to 6C, the memory I/F 142 may generate a parity chunk by performing a chip kill operation on the unit user data USER_D and the end-to-end parities E2E_P instead of performing a chip kill operation on the data chunks. Therefore, it is possible to save the memory resource and the processing resource of the controller 130, which are required for the chip kill operation. For example, an internal parity INT_P generated by an internal parity operation on unit user data USER_D of 4 KB and an end-to-end parity E2E_P of 4 byte may reach several hundreds of bytes. When a chip kill operation is performed on the unit user data USER_D and the end-to-end parities E2E_P, there is no need to store the internal parity INT_P having a length of the several hundreds of bytes for the chip kill operation and an operation on the internal parity INT_P may be omitted.

The unit user data USER_D and the end-to-end parity E2E_P for the internal parity operation of the memory I/F 142 may include an error bit due to various reasons. For example, an error may occur in the unit user data USER_D or the end-to-end parity E2E_P while the unit user data USER_D and the end-to-end parity E2E_P are transferred from the host I/F 132 to the memory I/F 142 through the memory 144, or while the transferred unit user data USER_D and end-to-end parity E2E_P are configured into a source word within the data chunk 610 by the memory I/F 142.

That is, the unit user data USER_D and the end-to-end parity E2E_P provided from the host I/F 132 may not coincide with the unit user data USER_D and the end-to-end parity E2E_P within the source word included in the data chunk 610 due to the error occurring in the course of the transferring the unit user data USER_D and the end-to-end parity E2E_P from the host I/F 132 to the memory I/F 142 through the memory 144 or the generating of the data chunk 610. The discrepancy between the data from the host I/F 132 and the data included in the data chunk 610 due to the error may cause discrepancy between the source word included in the data chunk 610 and the source word reflected in the parity chunk 630, the source words stemming from the same unit user data USER_D and end-to-end parity E2E_P. The discrepancy between the source words means that the data chunk 610 may not be recovered even by the parity chunk 630. When the memory I/F 142 generates the parity chunk 630 by using the unit user data USER_D and the end-to-end parities E2E_P, which are transferred through the memory 144, and programs the generated parity chunk 630 to the memory device 150, the data chunk 610 may not be normally recovered with the programmed parity chunk 630. When the data chunk 610 cannot be normally recovered with the parity chunk 630, the reliability of the memory system 110 may be reduced.

In accordance with the present embodiment, the memory I/F 142 may obtain the end-to-end parity E2E_P and the unit user data USER_D, which contain no errors, by detecting or correcting an error of data received from the memory 144. The memory I/F 142 may determine whether an error is contained in the source word included in the data chunk 610, by using the error-free end-to-end parity E2E_P and generate the parity chunk 630 by using the source word only when no error is contained in the source word. Therefore, the reliability of the memory system 110 may be improved.

Figure 7:
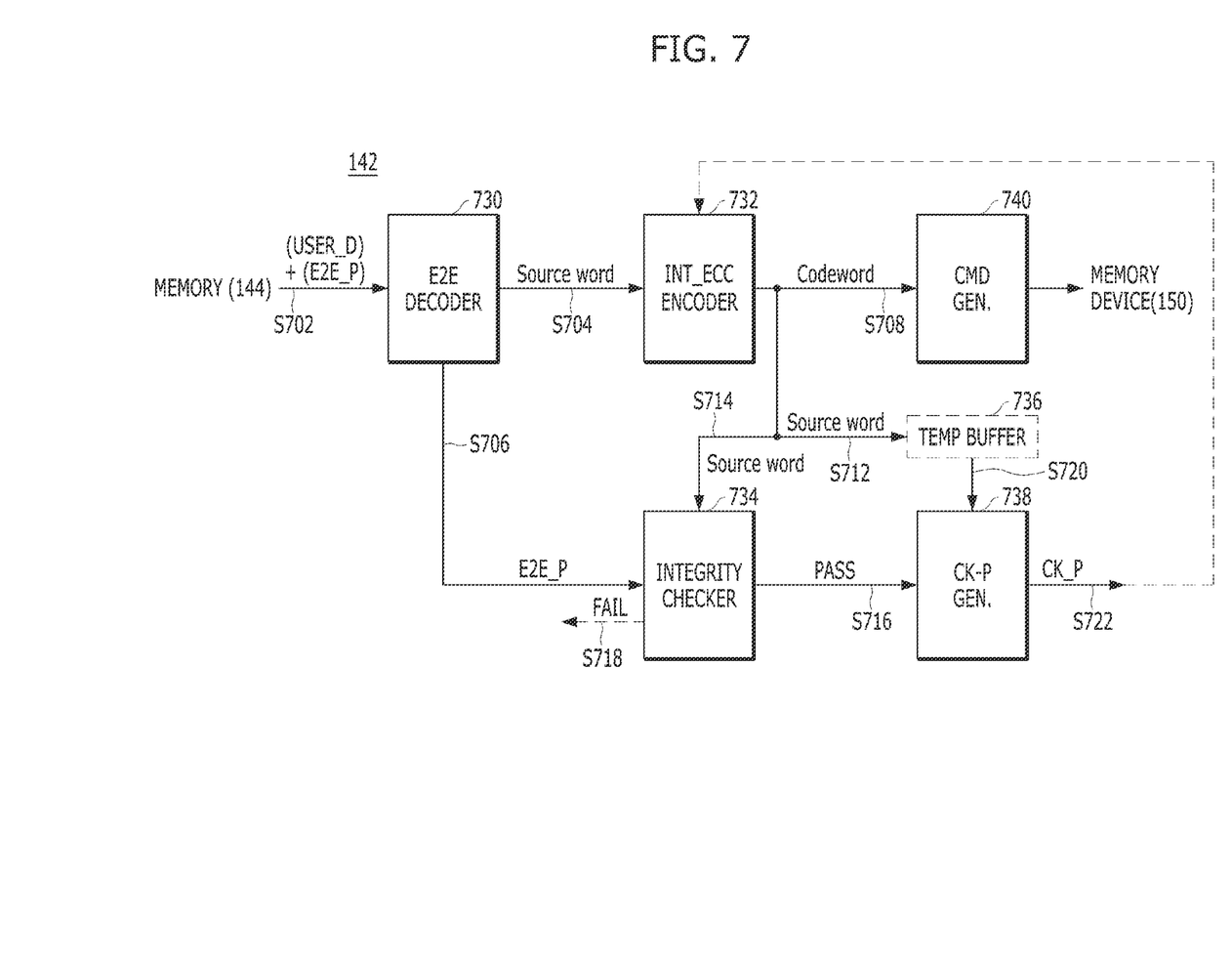
FIG. 7 is a diagram illustrating a memory interface (I/F) 142 in accordance with the first embodiment of the present disclosure.

FIG. 7 is a diagram illustrating the memory I/F 142 in accordance with the first embodiment of the present disclosure.

The memory I/F 142 may control a program operation of the memory device 150 in response to control of the processor 134. The memory I/F 142 may acquire the unit user data USER_D to be programmed to the memory device 150 and the end-to-end parity E2E_P added to the unit user data USER_D.

In accordance with the first embodiment, the memory I/F 142 may include an end-to-end decoder 730, an internal encoder 732, an integrity checker 734, a temporary buffer 736, a chip kill parity generator 738 and a command generator 740.

The end-to-end decoder 730 may detect or correct an error of the unit user data USER_D using the end-to-end parity E2E_P, thereby acquiring the unit user data USER_D and the end-to-end parity E2E_P, which contain no error. The end-to-end decoder 730 may detect or correct an error of the unit user data USER_D by using the same code as an error detection code or error correction code which the host I/F 132 has used in order to add the end-to-end parity E2E_P.

The internal encoder 732 may acquire a source word including the unit user data USER_D and the end-to-end parity E2E_P from the end-to-end decoder 730 and perform an internal parity operation on the source word. The error correction code which may be used for the internal parity operation has been described with reference to FIG. 4. The internal encoder 732 may generate a codeword by adding the internal parity INT_P to the source word.

The temporary buffer 736 may temporarily store the source word included in the codeword.

The chip kill parity generator 738 may generate a chip kill parity CK_P by performing a chip kill operation using the source word acquired from the temporary buffer 736. For example, when initially acquiring the source word after resetting the chip kill parity CK_P, the chip kill parity generator 738 may update the chip kill parity CK_P by determining the source word as the chip kill parity CK_P. When acquiring the source word after the chip kill parity is determined, the chip kill parity generator 738 may update the chip kill parity CK_P by performing a chip kill operation on the chip kill parity and the acquired source word, for example, an XOR operation. The chip kill parity generator 738 may output the chip kill parity CK_P which is completed by performing a chip kill operation on a predetermined number of source words, and reset the chip kill parity CK_P.

The integrity checker 734 may check whether an error is included in the source word included in the codeword. The integrity checker 734 may acquire the error-corrected end-to-end parity E2E_P from the end-to-end decoder 730 and acquire the end-to-end parity E2E_P included in the codeword from the internal encoder 732. The integrity checker 734 may compare the end-to-end parities E2E_P to determine whether the end-to-end parities E2E_P are equal to each other, thereby determining the integrity of the source word stored in the temporary buffer 736. The integrity checker 734 may control the chip kill parity generator 738 to perform the chip kill parity operation using the source word, only when no error is contained in the source word stored in the temporary buffer 736.

The command generator 740 may generate a program command to program the data chunk and the parity chunk to the memory device 150, and provide the generated command to the memory device 150.

Hereafter, the operation of the memory I/F 142 in accordance with the first embodiment will be described.

The processor 134 may provide one or more unit user data USER_D to the memory I/F 142 while controlling the memory I/F 142 to program the one or more unit user data USER_D. For example, when a sufficient number of unit user data USER_D to be programmed to one stripe are stored in the memory 144, the processor 134 may provide the end-to-end decoder 730 with the unit user data USER_D and the corresponding end-to-end parities E2E_P.

In operation S702, the end-to-end decoder 730 may acquire the unit user data USER_D and the end-to-end parity E2E_P, which are stored in the memory 144.

The end-to-end decoder 730 may detect or correct errors of the unit user data USER_D and the end-to-end parity E2E_P, thereby acquiring the unit user data USER_D and the end-to-end parity E2E_P, which contain no error. When errors of the unit user data USER_D and the end-to-end parity E2E_P were detected but cannot be corrected, the memory I/F 142 may request the host I/F 132 to reacquire the unit user data USER_D from the host 102, and to generate the end-to-end parity E2E_P, in an embodiment.

In operation S704, the end-to-end decoder 730 may provide the unit user data USER_D and the end-to-end parity E2E_P as the source word to the internal encoder 732. The internal encoder 732 may generate a codeword by adding the internal parity INT_P to the source word acquired from the end-to-end decoder 730. While the source word is transferred from the end-to-end decoder 730 to the internal encoder 732, an error may occur in the source word.

In operation S706, the end-to-end decoder 730 may provide the error-corrected end-to-end parity E2E_P to the integrity checker 734.

In operation S708, the internal encoder 732 may provide the generated codeword as a data chunk to the memory device 150. The command generator 740 may generate a program command for programming the data chunk to the memory device 150 and provide the generated program command to the memory device 150.

In operation S712, the internal encoder 732 may store the source word, included in the codeword, in the temporary buffer 736.

In operation S714, the internal encoder 732 may provide the source word, included in the codeword, to the integrity checker 734. The integrity checker 734 may determine the integrity of the provided source word using the error-corrected end-to-end parity E2E_P received from the end-to-end decoder 730.

The error-corrected end-to-end parity E2E_P received from the end-to-end decoder 730 may be an error-free parity. The integrity checker 734 may detect an error of the unit user data USER_D using the error-free parity and the unit user data USER_D included in the provided source word. The integrity checker 734 may use the same code as an error detection code or error correction code used in the end-to-end decoder 730, in order to detect an error of the unit user data USER_D.

Furthermore, the integrity checker 734 may detect an error of the end-to-end parity E2E_P provided from the internal encoder 732 by comparing the error-free end-to-end parity E2E_P provided from the end-to-end decoder 730 and the end-to-end parity E2E_P provided from the internal encoder 732.

When no error is detected from the unit user data USER_D and the end-to-end parity E2E_P which are included in the source word, the integrity checker 734 may determine that no error is contained the source word. When no error is contained in the source word, the integrity checker 734 may provide a pass signal PASS to the chip kill parity generator 738 in operation S716.

When an error is detected from the end-to-end parity E2E_P or the unit user data USER_D included in the source word, the integrity checker 734 may determine that an error is contained the source word. When an error is contained in the source word, the integrity checker 734 may provide a failure signal FAIL to the processor 134 in operation S718, invalidate the data chunk programmed in the memory device 150, in operation S708, and then end the operation.

In an embodiment, the processor 134 may perform fail handling in response to the failure signal FAIL. In a first example of the fail handling, the processor 134 may request the host I/F 132 to reacquire the unit user data USER_D from the host 102 and to generate the end-to-end parity E2E_P, in response to the failure signal FAIL. In a second example of the fail handling, the processor 134 may provide a signal to the host 102, the signal notifying that a defect occurred in the memory system 110.

In operation S720, the chip kill parity generator 738 may acquire the source word stored in the temporary buffer 736, in response to the pass signal PASS from the integrity checker 734. The chip kill parity generator 738 may generate the chip kill parity CK_P by performing the chip kill operation using the source word.

In operation S722, the chip kill parity generator 738 may output the chip kill parity CK_P, which is completed by performing the chip kill operation on a predetermined number of source words, to the internal encoder 732. The internal encoder 732 may generate a codeword by adding the internal parity INT_P to the chip kill parity CK_P through substantially the same method as that described with reference to operation S704. The command generator 740 may control the memory device 150 to program the codeword as a parity chunk to the memory device 150.

In accordance with the present embodiment, even when an error is contained in the unit user data USER_D or the end-to-end parity E2E_P received by the memory I/F 142, the end-to-end decoder 730 may acquire the unit user data USER_D and the end-to-end parity E2E_P, which contain no errors. The integrity checker 734 may use the error-free end-to-end parity E2E_P provided from the end-to-end decoder 730 to detect an error which may occur in the source word while the source word is provided to the internal encoder 732 from the end-to-end decoder 730.

In accordance with the present embodiment, only when it is determined that no error is contained in the source word from the internal encoder 732, the chip kill parity generator 738 may perform the chip kill operation using the source word, thereby preventing the problem that a parity chunk with an error is generated from a source word with an error. Therefore, even when an uncorrectable error is contained in a data chunk read from the memory device 150, the memory I/F 142 may successfully recover the data chunk using the parity chunk.

So far, the memory I/F 142 and the parallel parity operation in the case that the source word includes only the unit user data USER_D and the end-to-end parity E2E_P have been described with reference to FIGS. 6A to 6C and 7. The source word may further include various data in addition to the unit user data USER_D and the end-to-end parity E2E_P. Referring to FIGS. 8A to 8C and 9, the memory I/F 142 and a parallel parity operation in accordance with a second embodiment will be described.

Figure 8A:
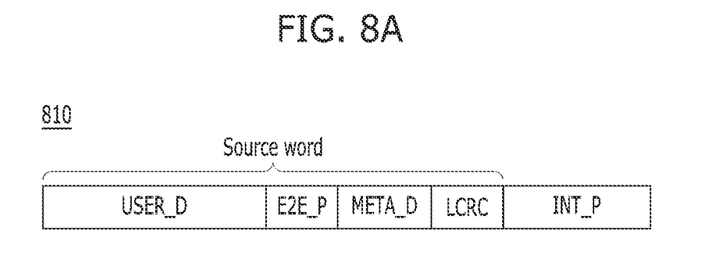
FIGS. 8A to 8C are diagrams for describing a parallel parity operation in accordance with a second embodiment of the present disclosure.
Figure 8B:
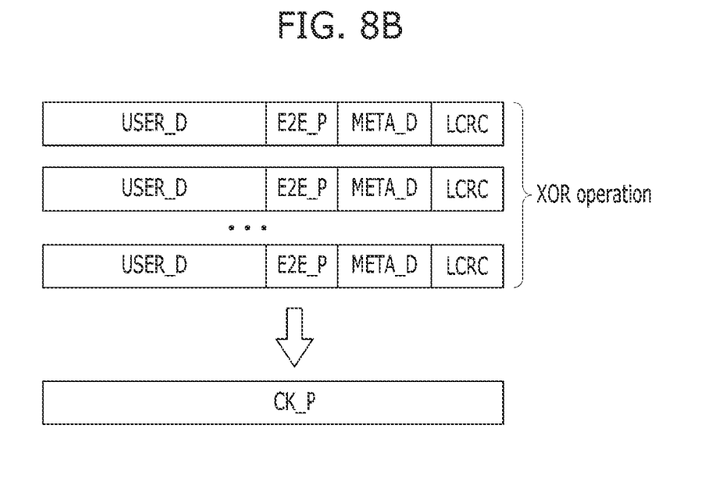
Figure 8C:
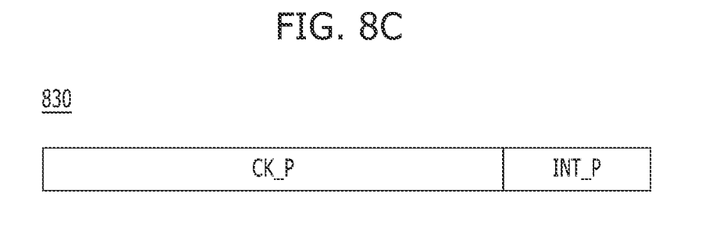

FIGS. 8A to 8C are diagrams for describing a parallel parity operation in accordance with the second embodiment.

FIG. 8A illustrates a data chunk 810.

The data chunk 810 may include not only unit user data USER_D and an end-to-end parity E2E_P but also meta data META_D, a checksum LCRC and an internal parity INT_P. The checksum LCRC may indicate a checksum for determining whether the data chunk 810 is properly corrected when the internal parity INT_P added to the source word is used to correct an error of the data chunk 810 read from the memory device 150.

The end-to-end parity E2E_P may be added by the host I/F 132. The meta data META_D and the checksum LCRC may be added by the memory I/F 142. The internal parity INT_P may be generated by performing an internal parity operation on a source word including the unit user data USER_D, the end-to-end parity E2E_P, the meta data META_D and the checksum LCRC. In an embodiment, the source word may be scrambled.

FIG. 8B illustrates a chip kill operation as an example of the parallel parity operation.

In the example of FIG. 8B, the chip kill operation may include an operation of generating a chip kill parity CK_P by performing an XOR operation on the unit user data USER_D, the end-to-end parities E2E_P, the meta data META_D and the checksums LCRC, which are included in a plurality of source words (e.g., source words included in 255 number of data chunks in the example of FIG. 5).

FIG. 8C illustrates a parity chunk 830 which is generated based on a parallel parity operation result.

The parity chunk 830 may include the chip kill parity CK_P and the internal parity INT_P. The memory I/F 142 may generate the internal parity INT_P by performing an internal parity operation on the chip kill parity CK_P, and generate the parity chunk 830 by adding the generated internal parity INT_P to the chip kill parity CK_P.

The unit user data USER_D and the end-to-end parity E2E_P, which are received from the memory I/F 142 by the memory I/F 142, may contain an error. While the memory I/F 142 generates a source word including the meta data META_D and the checksum LCRC in the unit user data USER_D and the end-to-end parity E2E_P, and scrambles the source word, an error may occur in the unit user data USER_D and the end-to-end parity E2E_P.

In accordance with the present embodiment, the memory I/F 142 may detect or correct an error of data received from the memory 144, and thus acquire the end-to-end parity E2E_P and the unit user data USER_D, which contain no errors. Furthermore, the memory I/F 142 may determine whether an error is contained in the unit user data USER_D or the end-to-end parity E2E_P included in the data chunk 610, by using the error-free end-to-end parity E2E_P. The memory I/F 142 may generate the parity chunk 630 using the source word, only when no error is contained in the unit user data USER_D and the end-to-end parity E2E_P. Therefore, the reliability of the memory system 110 may be improved.

Figure 9:
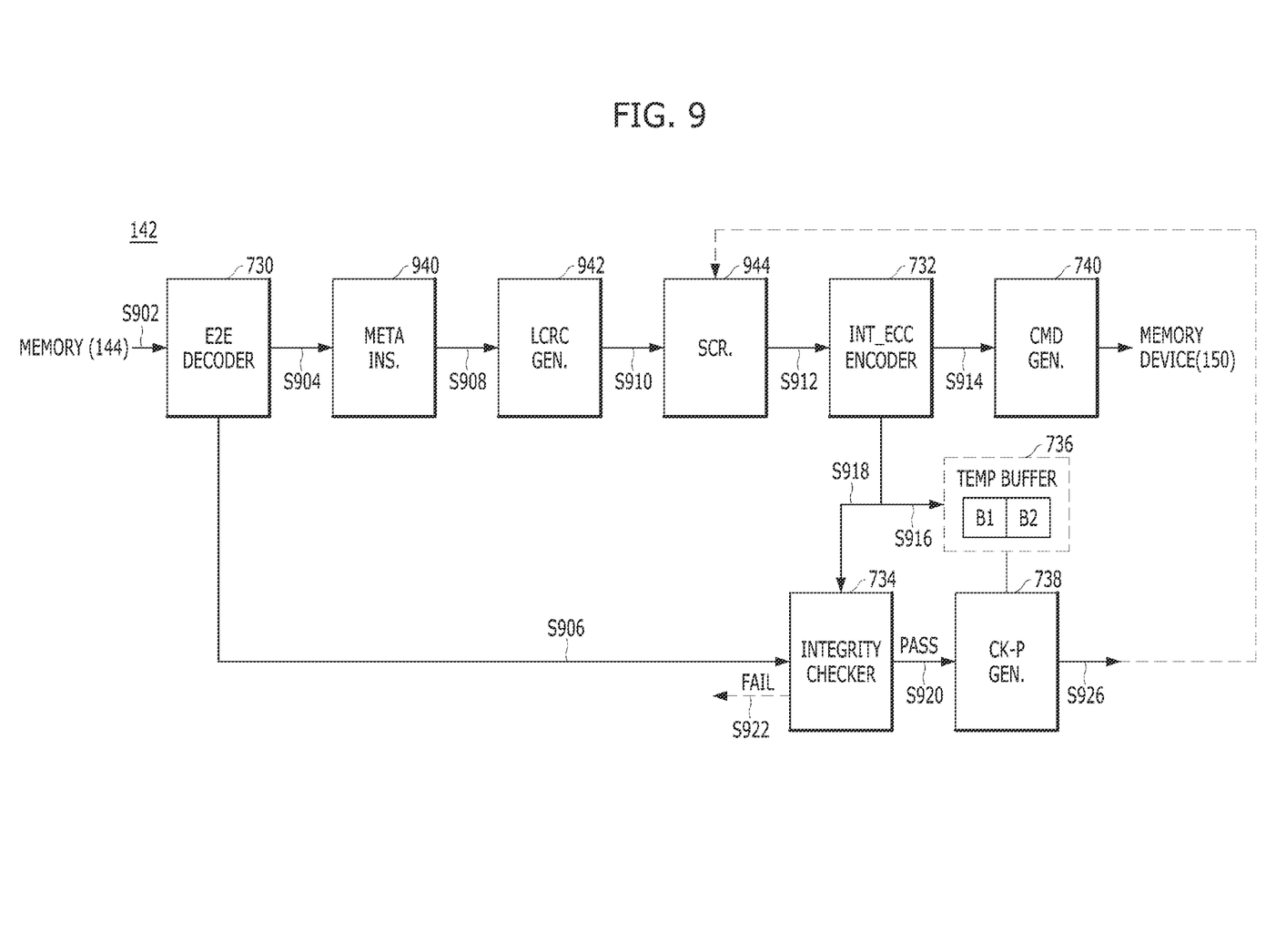
FIG. 9 is a diagram illustrating a memory I/F 142 in accordance with the second embodiment of the present disclosure.

FIG. 9 is a diagram illustrating a memory I/F 142 in accordance with the second embodiment of the present disclosure.

The memory I/F 142 in accordance with the second embodiment may further include a meta data inserter 940, an LCRC generator 942 and a scrambler 944, compared to the memory I/F 142 in accordance with the first embodiment. The temporary buffer 736 may include a first buffer B1 and a second buffer B2. The following descriptions for the second embodiment will be focused on differences from the first embodiment, and the corresponding components in the second embodiment will be represented by the same reference numerals as those of the first embodiment, and described based on those of the first embodiment.

The meta data inserter 940 may add meta data META_D to the unit user data USER_D and the end-to-end parity E2E_P, which are received from the end-to-end decoder 730 and contain no errors.

The LCRC generator 942 may add a checksum LCRC to the unit user data USER_D, the end-to-end parity E2E_P and the meta data META_D.

The scrambler 944 may generate a source word by scrambling the unit user data USER_D, the end-to-end parity E2E_P, the meta data META_D and the checksum LCRC.

The temporary buffer 736 may include the first buffer B1 and the second buffer B2. The first buffer B1 and the second buffer B2 may temporarily store the source word included in the codeword from the internal encoder 732. The internal encoder 732 may store source words, included in a plurality of codewords which are sequentially generated, alternately in the first and second buffers B1 and B2. For example, while the integrity checker 734 determines the integrity of a first source word stored in the first buffer B1, the internal encoder 732 may prepare a second source word. Even before the integration determination for the first source word is completed, the temporary buffer 736 may store the second source word using the empty second buffer B2. Therefore, the throughput of the memory I/F 142 may be improved.

Hereafter, the operation of the memory I/F 142 in accordance with the second embodiment will be described.

In operation S902, the end-to-end decoder 730 may detect or correct errors of the unit user data USER_D and the end-to-end parity E2E_P, which are received from the memory 144, thereby acquiring the unit user data USER_D and the end-to-end parity E2E_P, which contain no error.

In operation S904, the end-to-end decoder 730 may provide the meta data inserter 940 with the unit user data USER_D and the end-to-end parity E2E_P, which contain no errors. The meta data inserter 940 may add the meta data META_D to the unit user data USER_D and the end-to-end parity E2E_P, which are received from the end-to-end decoder 730.

In operation S906, the end-to-end decoder 730 may provide the error-free end-to-end parity E2E_P to the integrity checker 734.

In operation S908, the meta data inserter 940 may provide the LCRC generator 942 with the data to which the meta data META_D is added. The LCRC generator 942 may further add the checksum LCRC to the data received from the meta data inserter 940.

In operation S910, the LCRC generator 942 may provide the scrambler 944 with the data to which the checksum LCRC is further added. The scrambler 944 may generate a scrambled source word by scrambling the data received from the LCRC generator 942.

In operation S912, the scrambler 944 may provide the scrambled source word to the internal encoder 732. The internal encoder 732 may generate a codeword by adding the internal parity INT_P to the scrambled source word.

In operation S914, the internal encoder 732 may provide the generated codeword as a data chunk to the memory device 150. The command generator 740 may provide the memory device 150 with a program command for programming the data chunk.

In operation S916, the internal encoder 732 may store the source word, included in the codeword, in the temporary buffer 736. The temporary buffer 736 may alternately store source words, which are sequentially received from the internal encoder 732, in the first and second buffers B1 and B2.

The unit user data USER_D and the end-to-end parity E2E_P from the end-to-end decoder 730 may contain an error while passed through the meta data inserter 940, the LCRC generator 942 and the scrambler 944. The codeword, generated based on the source word including the unit user data USER_D and the end-to-end parity E2E_P which contain errors, may be programmed as a data chunk to the memory device 150, and the parity chunk generated through the source word included in the codeword may be programmed to the memory device 150. When a source word with an error is programmed to the memory device 150, it is difficult for the memory I/F 142 to detect and correct an error of the source word stored in the memory device 150, therefore the reliability of the data stored in the memory device 150 is reduced.

In operation S918, the internal encoder 732 may provide the source word, included in the codeword, to the integrity checker 734. The integrity checker 734 may determine whether an error is included in the provided source word, by using the error-corrected end-to-end parity E2E_P received from the end-to-end decoder 730. For example, when the integrity checker 734 received the scrambled source word, the integrity checker 734 may descramble the scrambled source word, and determine whether an error is included in the provided source word by using the error-corrected end-to-end parity E2E_P and the descrambled source word.

When no error is contained in the source word, the integrity checker 734 may provide a pass signal PASS to the chip kill parity generator 738 in operation S920.

When an error is contained in the source word, the integrity checker 734 may provide a failure signal FAIL to the processor 134 in operation S922, invalidate the data chunk programmed in the memory die, in operation S914, then end the operation.

In operation S926, the chip kill parity generator 738 may output the chip kill parity CK_P, which is completed by performing a chip kill operation on a predetermined number of source words, to the scrambler 944. The internal encoder 732 may acquire scrambled chip kill parity CK_P from the scrambler 944, and generate a parity chunk by adding the internal parity INT_P to the chip kill parity CK_P. The command generator 740 may control the memory device 150 to program the parity chunk.

In accordance with the present embodiment, the memory I/F 142 may detect or correct errors of the unit user data USER_D and the end-to-end parity E2E_P from the memory 144, thereby acquiring the unit user data USER_D and the end-to-end parity E2E_P, which contain no error. The memory I/F 142 may generate the source word based on the unit user data USER_D and the end-to-end parity E2E_P, which contain no error. The memory I/F 142 may determine whether an error is included in the source word, based on the error-free end-to-end parity E2E_P provided from the end-to-end decoder, thereby preventing an issue in which a parity chunk with an error is generated from a source word with an error. Therefore, the reliability of the memory system 110 may be improved.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

Although various embodiments have been described for illustrative purposes, it will be apparent to those skilled in the art that various changes and modifications may be made without departing from the spirit and scope of the invention as defined in the following claims.

What is claimed is:

1. A controller for controlling a memory device, comprising:
   a host interface suitable for adding an end-to-end parity to unit user data;
   an end-to-end decoder suitable for correcting an error in the unit user data and the end-to-end parity;
   an internal encoder suitable for generating a data chunk by adding a first internal parity to a source word which includes the unit user data and the end-to-end parity from the end-to-end decoder and buffering the source word into a buffer;
   an integrity checker suitable for determining whether an error is included in the source word included in the data chunk, by using the end-to-end parity from the end-to-end decoder; and
   a parallel parity generator suitable for receiving the source word from the buffer according to a result of the determination, and completing a parallel parity based on a predetermined number of source words received from the buffer,
   wherein the internal encoder is further suitable for generating a parity chunk by adding a second internal parity to the completed parallel parity.

2. The controller of claim 1, further comprising a command generator suitable for controlling a memory device to program the data chunk and the parity chunk.

3. The controller of claim 2, wherein the integrity checker is further suitable for outputting a failure signal when an error is included in the source word and invalidating the data chunk programmed in the memory device.

4. The controller of claim 3, further comprising a processor suitable for controlling the host interface to re-acquire the unit user data from a host and add an end-to-end parity to the reacquired unit user data, in response to the output failure signal.

5. The controller of claim 3, further comprising a processor suitable for providing a signal to the host in response to the output failure signal, the signal notifying a defect of a memory system including the controller and the memory device.

6. The controller of claim 1, wherein the integrity checker determines whether the error is included in the end-to-end parity included in the source word by comparing the end-to-end parity from the end-to-end decoder to the end-to-end parity included in the source word.

7. The controller of claim 6, wherein the integrity checker determines whether the error is included in the unit user data included in the source word, by detecting the error of the unit user data included in the source word through the end-to-end parity from the end-to-end decoder.

8. The controller of claim 1, wherein the parallel parity generator completes the parallel parity by performing a chip kill operation on the predetermined number of source words for generating the parallel parity after the parallel parity is reset, the operation being performed whenever each of the predetermined number of source words is received.

9. The controller of claim 1, wherein the buffer including a plurality of buffer regions and suitable for alternately selecting one of the buffer regions whenever each of the predetermined number of source word is received from the internal encoder and storing the source word in the selected buffer region.

10. The controller of claim 1, further comprising a meta data inserter suitable for inserting meta data into the source word.

11. The controller of claim 1, further comprising a checksum generator suitable for inserting a checksum into the source word, the checksum being used during a read operation on the data chunk to determine whether the data chunk is properly corrected by using the first internal parity added to the source word.

12. The controller of claim 1, further comprising a scrambler suitable for scrambling the source word.

13. A memory system comprising:
    a memory device comprising a plurality of memory dies; and
    a controller suitable for controlling the memory device,
    wherein the controller is further suitable for:
    correcting an error in unit user data and a corresponding end-to-end parity for acquiring an error-corrected end-to-end parity,
    generating a data chunk by adding an internal parity to a source word including the unit user data and the corresponding end-to-end parity,
    determining whether an error is included in the source word included in the data chunk, by using the error-corrected end-to-end parity and outputting the source word according to a result of the determining, and
    generating a parity chunk using a predetermined number of outputted source words.

14. The memory system of claim 13, wherein the controller is further suitable for controlling the plurality of memory dies to program the plurality of data chunks including the predetermined number of outputted source words and the parity chunk in parallel.

15. The memory system of claim 13, wherein the controller determines whether the error is included in the end-to-end parity included in the source word, by comparing the error-corrected end-to-end parity to the end-to-end parity included in the source word.

16. The memory system of claim 15, wherein the controller determines whether the error is included in the unit user data included in the source word by detecting the error of the unit user data included in the source word through the error-corrected end-to-end parity.

17. The memory system of claim 13,
    wherein the controller is further suitable for completing a parallel parity by performing a chip kill operation on the predetermined number of source words for generating the parallel parity after the parallel parity is reset, and
    wherein the controller generates the parity chunk by adding a second internal parity to the completed parallel parity.

18. The memory system of claim 13, further comprising a buffer including a plurality of buffer regions and suitable for alternately selecting one of the buffer regions whenever the data chunk is generated and storing the source word included in the data chunk in the selected buffer regions.

19. An operating method of a controller, the operating method comprising:
    receiving block data including plural stripe data pieces each having plural page data pieces;

generating a source word including each of the page data pieces and a corresponding end-to-end parity;
obtaining an error-corrected end-to-end parity by error-correcting the source word;
generating a data chunk including the source word and a corresponding internal parity;
verifying integrity of the source word through the error-corrected end-to-end parity while controlling a nonvolatile memory device to store the data chunk in a memory block in units of the stripe data pieces;
generating a chip kill parity corresponding to the block data by performing a logical operation on the data chunks corresponding to the block data on condition that the integrities of the source words corresponding to the block data are verified;
generating a parity chunk including the chip kill parity and a corresponding internal parity; and
controlling the nonvolatile memory device to store the parity chunk in the memory block.

* * * * *